United States Patent
Patrick et al.

(10) Patent No.: US 7,650,421 B2
(45) Date of Patent: Jan. 19, 2010

(54) ADAPTABLE ACCELERATED CONTENT STREAMING

(75) Inventors: Stuart Raymond Patrick, Bellevue, WA (US); James E. Walsh, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 670 days.

(21) Appl. No.: 10/331,817

(22) Filed: Dec. 30, 2002

(65) Prior Publication Data

US 2004/0128396 A1   Jul. 1, 2004

(51) Int. Cl.
   *G06F 15/16* (2006.01)
(52) U.S. Cl. .................. 709/231; 709/223; 709/232
(58) Field of Classification Search .......... 709/223, 709/231, 232, 234
   See application file for complete search history.

(56) References Cited

U.S. PATENT DOCUMENTS

| | | |
|---|---|---|
| 4,963,995 A | 10/1990 | Lang |
| 5,057,932 A | 10/1991 | Lang |
| 5,132,964 A | 7/1992 | Esaki |
| 5,164,839 A | 11/1992 | Lang |
| 5,262,875 A | 11/1993 | Mincer et al. |
| 5,440,334 A | 8/1995 | Walters et al. |
| 5,568,181 A | 10/1996 | Greenwood et al. |
| 5,710,970 A | 1/1998 | Walters et al. |
| 5,758,076 A * | 5/1998 | Wu et al. ............. 709/231 |
| 5,787,472 A | 7/1998 | Dan et al. |
| 5,835,495 A | 11/1998 | Ferriere |
| 5,872,920 A | 2/1999 | Hausman et al. |
| 5,890,010 A | 3/1999 | Nishigami |
| 5,913,038 A | 6/1999 | Griffiths |
| 5,931,961 A | 8/1999 | Ranganathan et al. |
| 5,963,202 A | 10/1999 | Polish et al. |
| 5,978,567 A | 11/1999 | Rebane et al. |
| 5,983,263 A | 11/1999 | Rothrock et al. |
| 5,995,705 A | 11/1999 | Lang |
| 5,996,015 A | 11/1999 | Day et al. |
| 6,005,621 A | 12/1999 | Linzer et al. |
| 6,014,706 A | 1/2000 | Cannon et al. |
| 6,041,345 A | 3/2000 | Levi et al. |
| 6,054,943 A | 4/2000 | Lawrence |
| 6,111,567 A | 8/2000 | Savchenko et al. |
| 6,118,817 A | 9/2000 | Wang |
| 6,120,149 A | 9/2000 | Hosoi |
| 6,161,201 A | 12/2000 | Payne et al. |
| 6,195,692 B1 | 2/2001 | Hsu |
| 6,209,041 B1 | 3/2001 | Shaw et al. |

(Continued)

OTHER PUBLICATIONS

"Real Time Streaming Protocol (RTSP)", Schulzrinne et al., Network Working Group Request for Comments: 2326, Apr. 1998; pp. 1-92.

(Continued)

*Primary Examiner*—Vivek Srivastava
*Assistant Examiner*—Adnan Mirza

(57) ABSTRACT

Adaptable accelerated content streaming allows data to be streamed from a server to a client over a network at an accelerated rate for an amount of time before reducing the rate. In accordance with one aspect, the accelerated rate is prohibited from exceeding a threshold amount, which is based at least in part on both a total bandwidth of the server and an amount of bandwidth currently being used by the server. In accordance with one aspect, the data can be streamed to the client at up to an adaptable accelerated rate.

12 Claims, 4 Drawing Sheets

U.S. PATENT DOCUMENTS

| | | | |
|---|---|---|---|
| 6,216,163 | B1 | 4/2001 | Bharali et al. |
| 6,262,990 | B1 | 7/2001 | Ejiri |
| 6,272,148 | B1 | 8/2001 | Takagi et al. |
| 6,292,834 | B1 | 9/2001 | Ravi et al. |
| 6,292,880 | B1 | 9/2001 | Mattis et al. |
| 6,314,492 | B1 | 11/2001 | Allen et al. |
| 6,327,421 | B1 | 12/2001 | Tiwari et al. |
| 6,329,165 | B1 | 12/2001 | Chattoraj et al. |
| 6,343,298 | B1 | 1/2002 | Savchenko et al. |
| 6,351,767 | B1 | 2/2002 | Batchelder et al. |
| 6,385,647 | B1 | 5/2002 | Willis et al. |
| 6,405,256 | B1 | 6/2002 | Lin et al. |
| 6,407,680 | B1 | 6/2002 | Lai et al. |
| 6,421,348 | B1 | 7/2002 | Gaudet et al. |
| 6,449,269 | B1 | 9/2002 | Edholm et al. |
| 6,480,498 | B1 | 11/2002 | Gaudet et al. |
| 6,484,199 | B2 | 11/2002 | Eyal |
| 6,502,135 | B1 | 12/2002 | Munger et al. |
| 6,553,376 | B1 | 4/2003 | Lewis et al. |
| 6,611,868 | B1 | 8/2003 | Arutyunov |
| 6,611,898 | B1 | 8/2003 | Slattery et al. |
| 6,614,763 | B1 | 9/2003 | Kikuchi et al. |
| 6,643,259 | B1 | 11/2003 | Borella et al. |
| 6,725,333 | B1 | 4/2004 | Degenaro et al. |
| 6,735,634 | B1 | 5/2004 | Geagan, III et al. |
| 6,757,255 | B1 | 6/2004 | Aoki et al. |
| 6,760,765 | B1 | 7/2004 | Asai et al. |
| 6,765,878 | B1 | 7/2004 | Carlson |
| 6,772,375 | B1 | 8/2004 | Banga |
| 6,779,043 | B1 | 8/2004 | Crinion |
| 6,785,288 | B1 | 8/2004 | Enns et al. |
| 6,842,836 | B2 * | 1/2005 | Yun et al. .................. 711/167 |
| 6,952,424 | B1 | 10/2005 | Bass et al. |
| 6,954,430 | B2 | 10/2005 | Haglund |
| 6,986,018 | B2 | 1/2006 | O'Rourke et al. |
| 6,990,070 | B1 | 1/2006 | Aweya et al. |
| 7,007,090 | B1 * | 2/2006 | Spangler et al. ............ 709/226 |
| 7,020,087 | B2 | 3/2006 | Steinberg et al. |
| 7,051,110 | B2 | 5/2006 | Hagai et al. |
| 7,054,774 | B2 | 5/2006 | Batterberry et al. |
| 7,054,911 | B1 | 5/2006 | Lango et al. |
| 7,054,949 | B2 | 5/2006 | Jennings |
| RE39,184 | E | 7/2006 | Schloss et al. |
| 7,073,028 | B2 | 7/2006 | Lango et al. |
| 7,076,560 | B1 | 7/2006 | Lango et al. |
| 7,096,271 | B1 * | 8/2006 | Omoigui et al. ............ 709/231 |
| 7,133,881 | B2 | 11/2006 | Sirivara et al. |
| 7,266,613 | B1 | 9/2007 | Brown et al. |
| 2002/0047899 | A1 | 4/2002 | Son et al. |
| 2002/0048448 | A1 | 4/2002 | Daniels |
| 2002/0049817 | A1 | 4/2002 | Drory et al. |
| 2002/0090027 | A1 | 7/2002 | Karczewicz et al. |
| 2002/0170067 | A1 | 11/2002 | Norstrom et al. |
| 2002/0194608 | A1 | 12/2002 | Goldhor |
| 2003/0018799 | A1 | 1/2003 | Eyal |
| 2003/0099364 | A1 | 5/2003 | Thompson et al. |
| 2003/0236902 | A1 | 12/2003 | Weiss et al. |
| 2003/0236912 | A1 | 12/2003 | Klemets et al. |
| 2004/0003101 | A1 | 1/2004 | Roth et al. |
| 2004/0054912 | A1 | 3/2004 | Adent et al. |
| 2004/0244010 | A1 | 12/2004 | Kleyman et al. |

OTHER PUBLICATIONS

"Hypertext Transfer Protocol—HTTP/1.1", Fielding et al., Network Working Group Request for Comments: 2616, Jun. 1999; pp. 1-176.

"Accelerating Internet Streaming Media Delivery using Network-Aware Partial Caching", Jin et al., IEEE, 2002, pp. 153-160.

"TAPI 3.0 Connection and Media Services" Microsoft Windows 2000 Server Copyright 1999 pp. 1-23.

Coulson, "A Distributed Object Platform Infrastructure for Multimedia Applications," Comptuer Communications, Jul. 1998, 27 pages, vol. 21, No. 9.

"Performance considerations for TCP/IP in wide area networks" Proceedings 19th Conference on Oct. 2-5, 1994 pp. 166-175.

Lixin Gao et al. "Supplying instantaneous video-on-demand services using controlled multicast", Multimedia Computing and Systems, 1999, IEEE International Conference on Florence, Italy Jun. 7,11, 1999, pp. 117-121.

Nagle, "Congestion Control in IP/TCP Internetworks," RFC 896, Jan. 6, 1984, 8 pages.

Stevens, "TCP Slow Start, Congestion Avoidance, Fast Retransmit, and Fast Recovery Algorithms," RFC, Jan. 1997, 6 pages.

From the Internet: http://www.freesoft.org/CIE/Topics/83.htm, "TCP Protocol Overview," Connected: An Internet Encyclopedia, retrieved on May 31, 2000.

From the Internet: http:/www.scit.wlv.ac.uk/~jphb/comms/tcp.html, "Transmission Control Protocol," retreived on May 31, 2000.

Microsoft Computer Dictionary $5^{th}$ Edition, p. 428.

Kamiyama N et al. "Renegotiated CBR transmission in interactive video-on-demand system", Multimedia Computing and Systems '97 Proceedings, IEEE International Conference, Ottawa ONT, Canada Jun. 3-6, 1997. pp. 12-19.

Petit G H et al. "Bandwidth resource optimization in ivdeo-on-demand network architectures", Community Networkign Integrated Multimedia Services to the Home, 1994, Proceedings of the 1st International Workshop on San Francisco, CA Jul. 13-14, 1994, pp. 91-97.

Dutta A at al. "A Streaming architecture for next generation internet", ICC 2001, 2001 IEEE International Conference on Communications. Helsinky, Finland, Jun. 11-14, 2001, 1303-1309.

Lixin Gao et al. "Supplying instantaneous video-on-demand services using controlled multicast", Multimedia Computing and Systems, 1999, IEEE International Conference on Florence, Italy Jun. 7,11, 1999, pp. 117-121.

Paknikar, Shantanu, et al. "A Caching and Streaming Framework for Multimedia," ACM Multimedia 2000, Los Angeles, CA; pp. 13-20.

Guo, Katherine, et al. "RCache: Design and Analysis of Scalable, Fault Tolerant Multimedia Stream Caching Schemes," Scalability and Traffic Control in IP Networks, Proceedings of SPIE vol. 4526, (2001); pp. 68-86.

Aboobaker, N., et al., "Streaming Media Congestion Control Using Bandwidth Estimation," Lecture Notes in Computer Science, 2002, vol. 2496, pp. 89-100.

Liefooghe, P., et al., "An Architecture for Seamless Access to Multicast Content," Proceedings of the 26th Annual IEEE Conference on Local Computer Networks, Nov. 8, 2000, pp. 488-494.

Braun, T., et al., "Multicast for Small Conferences," Proceedings of the Sixth IEEE Symposium on Computers and Communications, Jul. 3, 2001, pp. 145-150.

Fleischman, E., "WAVE and AVI Codec Registries," Network Working Group Request for Comments: 2361, The Internet Society, Jun. 1998, pp. 1-71.

Camarillo, G., et al., "Grouping of Media Lines in the Session Description Protocol (SDP)," Network Working Group Request for Comments: 3388, The Internet Society, Dec. 2002, pp. 1-21.

Handley, M., et al., "SDP: Session Description Protocol," Network Working Group Request for Comments: 2327, The Internet Society, Apr. 1998, pp. 1-42.

"Advanced Systems Format (ASF) Specification," Revision 01.20.01e, Microsoft Corp., Sep. 2003, pp. i-vi and 1-93.

Schulzrinne, H., et al., "RTP: A Transport Protocol for Real-Time Applications," Network Working Group Request for Comments: 3550, Jul. 2003, pp. 1-104.

Muuss, M., "The Story of the PING Program," Oct. 18, 1999, retrieved on Apr. 6, 2004 from the Internet Archive at <http://web.archive.org/web/19991018225218/ftp.arl.mil/~mike/ping.htm>, 3 pages.

Muuss, M., "The Research Interests of Mike Muuss," Oct. 8, 1999, retrieved on Apr. 6, 2004 from the Internet Archive at <http://web.archive.org/web/19991008020453/ftp.arl.mil/~mike/>, 2 pages.

Lai, K., et al., "Measuring Bandwidth," INFOCOM '99; Eighteenth Annual Joint Conference of the IEEE Computer and Communications Societies Proceedings; IEEE New York, NY, USA, Mar. 21, 1999, pp. 235-245.

Minshall, G., et al., "Application performance pitfalls and TCP's Nagle algorithm"; vol. 27, No. 4, Mar. 2000, pp. 36-44.

Hayes, D. A., et al., "Impact of Flow Control on quality of service driven packet scheduling disciplines," Proceedings of the 1999 IEEE International Conference on Control Applications, Kohala Coast, HI, Aug. 22, 1999; pp. 1454-1459.

Nishida, Y., et al., "Congestion Control Mechanism for TCP with Packet Pair Scheme," IEICE Transactions on Information and Systems, Institute of Electronics Information and Comm. Egn. Tokyo, JP, vol. E82-D, No. 4, Apr. 1999, pp. 854-862.

Khalil, K. M., et al., "Performance Considerations for TCP/IP in Wide Area Networks," IEEE 1994, pp. 166-175.

Moldeklev, K., et al., "How a Large ATM MTU Causes Deadlocks in TCP Data Transfers," IEEE/ACM Transactions on Networking, vol. 3, No. 4, Aug. 1995, pp. 409-422.

Shannon, C.E., "A Mathematical Theory of Communication," reprinted with corrections from The Bell System Technical Journal, vol. 27, pp. 379-423, 623-656, Jul., Oct. 1948, (pages renumbered as 1-55).

"TAPI 3.0 Connection and Media Services", Microsoft Windows 2000 Server, Copyright 1999, pp. 1-23.

* cited by examiner

ADAPTABLE ACCELERATED CONTENT STREAMING

TECHNICAL FIELD

This invention relates to streaming media, and particularly to adaptable accelerated content streaming.

BACKGROUND

Content streaming, such as the streaming of audio, video, and/or text media content is becoming increasingly popular. The term "streaming" is typically used to indicate that the data representing the media is provided over a network to a client computer and the client computer renders the streaming content as it is received from a network server, rather than waiting for an entire "file" to be delivered.

When streaming media content over a network, the data is typically sent in packets. However, there is typically no guarantee that data packets will arrive at their destination in the same order that they are received, or even that they will arrive at their destination at all. Additionally, there is typically no guarantee that the time it takes a data packet to travel from the source to the destination will be a specific amount, or even that it will be the same for different data packets. In order to account for these variances in data delivery to the client computer, the client computer maintains a buffer of data, typically on the order of three to five seconds worth of data. This buffer allows the client computer to smooth out the variances so that they are not noticeable to the user during playback of the content. However, one problem with this buffering is that it causes the user to have to wait for the buffer to be initially filled before playback begins, thereby delaying the starting of the playback. It would be beneficial to provide a way to reduce this user-unfriendly delay.

The adaptable accelerated content streaming described below solves these and other problems.

SUMMARY

Adaptable accelerated content streaming is described herein.

In accordance with one aspect, data is allowed to be streamed from a server to a client over a network at up to an adaptable accelerated rate for an amount of time before reducing the rate at which the data is streamed to the client.

BRIEF DESCRIPTION OF THE DRAWINGS

The same numbers are used throughout the document to reference like components and/or features.

DETAILED DESCRIPTION

Adaptable accelerated content streaming is described herein. When a server device is initially streaming media content to a client device, the streaming is performed at an accelerated rate so that the buffer on the client device can be filled quicker. When this initial buffer fill is finished, the rate of streaming is reduced to a steady state rate (e.g., the same rate as the streaming media is encoded at). The actual accelerated rate is determined based at least in part on the available bandwidth.

Figure 1:
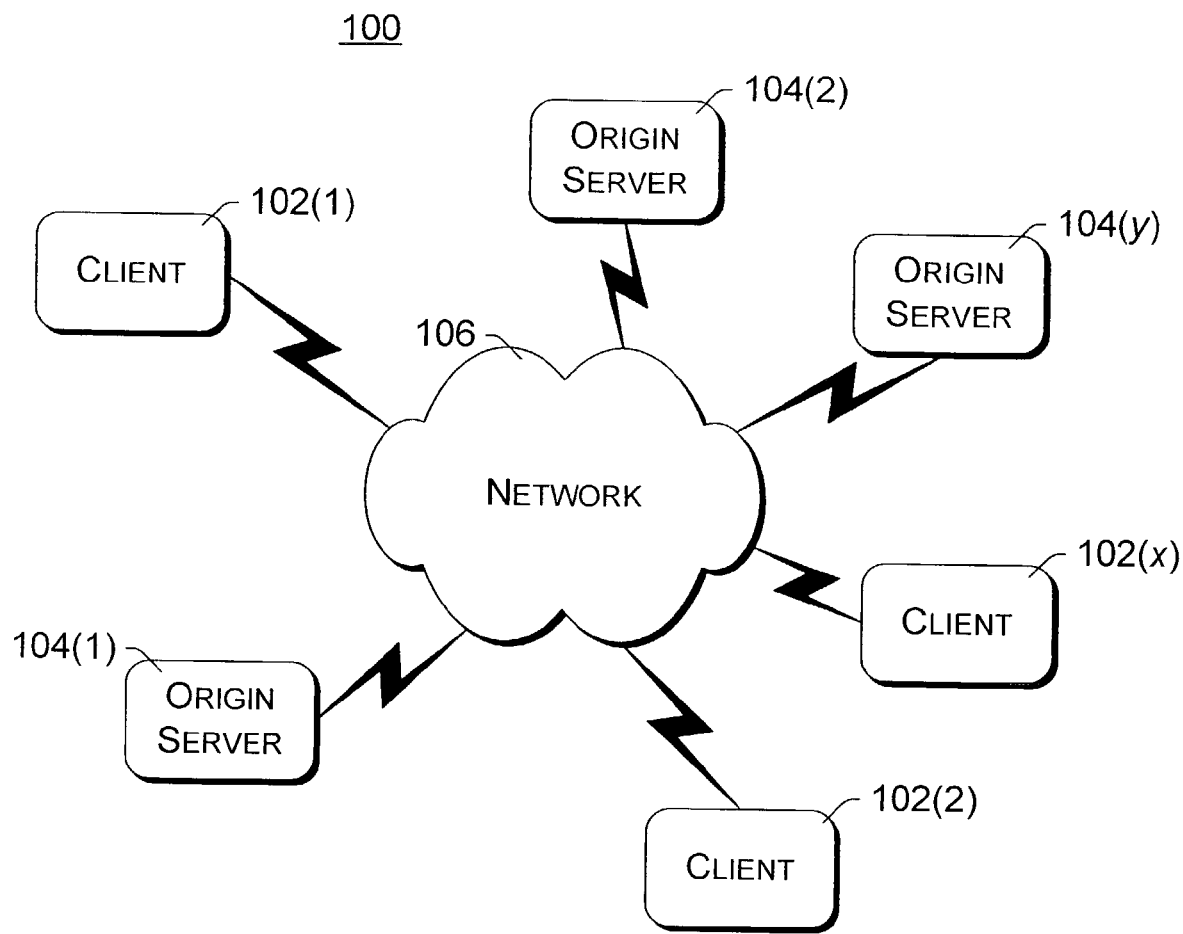
FIG. 1 illustrates an exemplary network environment in which adaptable accelerated content streaming can be employed.

FIG. 1 illustrates an exemplary network environment 100 in which adaptable accelerated content streaming can be employed. In environment 100, multiple (x) client computing devices 102(1), 102(2), . . . , 102(x) are coupled to multiple (y) origin server computing devices 104(1), 104(2), . . . , 104(y) via a network 106. Network 106 is intended to represent any of a variety of conventional network topologies and types (including optical, wired and/or wireless networks), employing any of a variety of conventional network protocols (including public and/or proprietary protocols). Network 106 may include, for example, the Internet as well as possibly at least portions of one or more local area networks (LANs) and/or wide area networks (WANs).

When requesting streaming media content that is available from an origin server device 104, the request is routed from client device 102 to the server device 104 via network 106. The origin server device 104 receives the request and returns the requested content to the requesting client device 102 via network 106. One or more proxy servers (not shown) may be part of network 106, and requests from client device 102 and responses to client device 102 may be sent to and received from such a proxy server(s) rather than the actual server device 104. Whatever device (whether it be an origin server, proxy server, or other device) is streaming media content to a client device 102 is referred to as the source device for that streaming media content.

Computing devices 102 and 104 can each be any of a variety of conventional computing devices, including desktop PCs, notebook or portable computers, workstations, mainframe computers, Internet appliances, gaming consoles, handheld PCs, cellular telephones or other wireless communications devices, personal digital assistants (PDAs), combinations thereof, etc. One or more of devices 102 and 104 can be the same types of devices, or alternatively different types of devices.

Server devices 104 can make any of a variety of data available for streaming to clients 102. The term "streaming" is used to indicate that the data representing the media is provided over a network to a client device and that playback of the content can begin prior to the content being delivered in its entirety. The data may be publicly available or alternatively restricted (e.g., restricted to only certain users, available only if the appropriate fee is paid, etc.). The data may be any of a variety of one or more types of content, such as audio, video, text, animation, etc. Additionally, the data may be "on-demand" (e.g., pre-recorded and of a known size) or alternatively "broadcast" (e.g., having no known size, such as a digital representation of a concert being captured as the concert is performed and made available for streaming shortly after capture).

Figure 2:
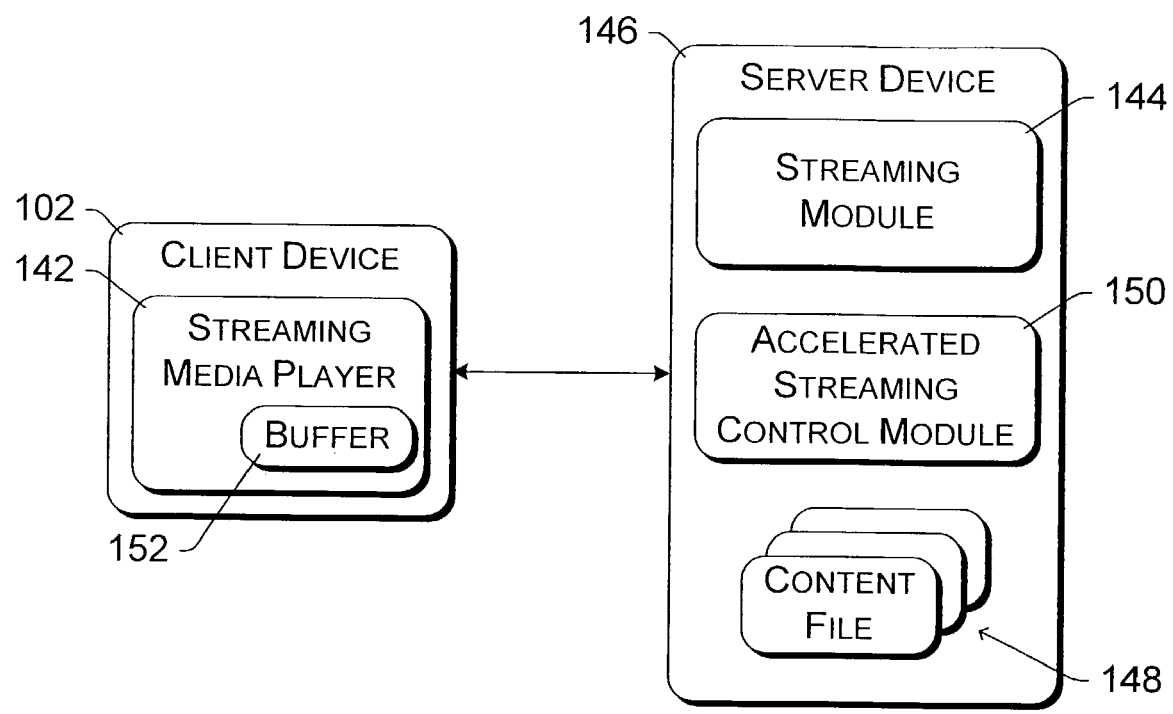
FIG. 2 illustrates exemplary client and server devices

FIG. 2 illustrates exemplary client and server devices. Client device 102 includes a streaming media player 142 configured to access a streaming module 144 of a source server device 146. Source server device 146 may be, for example, an origin server device 104 of FIG. 1, or alternatively another device (e.g., a proxy device). Source server device 146 also includes one or more streaming media content files 148 from which a selection can be made by media player 142 (e.g., based on user input at player 142) and the selected content file streamed to player 142. Although not shown in FIG. 2, one or more additional devices (e.g., firewalls, routers, gateways, bridges, multiple proxy servers, etc.) may be situated between client device 102 and server device 146. It should be noted that multiple clients 102 may access server 146 and that a single client 102 may access multiple servers 146, although only a single client 102 and server 146 have been shown in FIG. 2 for ease of explanation.

Client device 102 also includes a buffer 152 that is used to buffer streaming media content received from server device 146. Although illustrated as part of streaming media player 142, buffer 152 may alternatively be separate from streaming media player 142. Streaming media player 142 plays back the streaming media content from buffer 152, allowing smooth playback of the content despite variances in the order and/or timing of the receipt of data from server device 146.

Source server device 146 also includes an accelerated streaming control module 150 that determines an appropriate rate for accelerated streaming (also referred to as fast streaming) of media content to client device 102. Accelerated streaming control module 150 determines the appropriate rate for the accelerated streaming based on the bandwidth load of server device 146, as discussed in more detail below. Streaming module 144 streams the media content to streaming media player 142 at an accelerated rate that is greater than the steady state rate of the streaming media content.

By initially streaming the media content to client device 102 at an accelerated rate, content buffer 152 at device 102 can be filled quicker than when streaming at the steady state rate. Since streaming media player 142 typically begins playback of the streaming media content as soon as buffer 152 is filled to its desired level, by filling buffer 152 to that desired level more quickly playback of the streaming media content at client device 102 can begin sooner. The steady state rate of the streaming media content refers to the rate at which the streaming media content is streamed after accelerated streaming has stopped. Typically, the steady state rate of the streaming media content is the rate at which the streaming media content is encoded for playback (typically referred to as the encoded bit rate of the content), although alternatively this rate may vary. Different content can be encoded at different rates, which generally affect the quality of the content—higher encoded bit rates typically result in higher quality content playback. Additionally, different portions of content can be encoded at different rates, also referred to as variable bit rate encoding (e.g., quiet periods of a song may be encoded at 60 kbps (kilobits per second) while more "active" portions of the song may be encoded at 150 kbps).

By way of example, server device 146 may include, as one or more content files 148, content encoded at a rate of 100 kbps and also at a rate of 300 kbps. Assuming the user of client device 102 desires to view the 100 kbps content, streaming media player 142 requests the 100 kbps content from server device 146. Further assuming that streaming media player 142 desires buffer 152 to have five seconds worth of content before playback begins (that is, enough data so that playback of the content at the encoded rate will be approximately five seconds), which is 500 kb (kilobits) of data in this example, without accelerated streaming there would be a five second delay before playback begins while buffer 152 is filled to the desired level. However, with accelerated streaming, if the initial five seconds worth of data can be streamed at an accelerated rate of 500 kbps, then the delay is reduced to one second.

Communication between devices 102 and 146 can occur using a variety of different protocols. In one implementation, communication between devices 102 and 146 occurs using a version of the HyperText Transport Protocol (HTTP), such as version 1.0 (HTTP 1.0) or version 2.0 (HTTP 2.0). In another implementation, communication between devices 102 and 146 occurs using the Real Time Streaming Protocol (RTSP), such as RTSPU (RTSP used with User Datagram Protocol (UDP)) and/or RTSPT (RTSP used with Transmission Control Protocol (TCP)). Alternatively, other protocols may be used, such as the Session Initiation Protocol (SIP), the Simple Object Access Protocol (SOAP), the Microsoft Media Server (MMS) protocol (such as MMSU (MMS used with UDP) or MMST (MMS used with TCP), and so forth.

Additionally, streaming media content can be stored and streamed in accordance with any of a variety of different streaming media formats. In one exemplary implementation, media is streamed in accordance with the ASF format (Advanced Systems Format or Advanced Streaming Format). Additional information regarding ASF is available from Microsoft® Corporation of Redmond, Wash. Alternatively, or in conjunction with the ASF format, other streaming media formats may be used such as WMA (Windows Media Audio), WMV (Windows Media Video), MPEG (Moving Pictures Experts Group)-1, MPEG-2, MPEG-4, Quicktime, etc.

Different pieces of streaming media content are illustrated as different files 148 in FIG. 2, although alternatively a piece of streaming media content may be stored as multiple files (or, in the case of broadcast content, as no file). The manner in which a "piece" of content is defined can vary by implementation and based on the type of media. For example, for musical audio and/or video content each song can be a piece of content. Content may be separated into pieces along natural boundaries (e.g., different songs), or alternatively in other arbitrary manners (e.g., every five minutes of content is a piece).

Each piece of media content may include multiple streams, even though they may be stored together as a single file. Each such stream represents a particular type of media (e.g., audio, video, text, etc.), typically at a particular encoded bit rate (the rate at which the media content is encoded for playback). The encoded bit rate for a stream may be a static rate (e.g., the same for the entire stream) or may be a variable bit rate. It should be noted that the encoded bit rate is independent of the user-perceived playback speed of the content (for example, both a normal stream of content and a fast forward stream of content which the user perceives as two times the playback speed of the normal stream typically have the same encoded bit rate).

Figure 3:
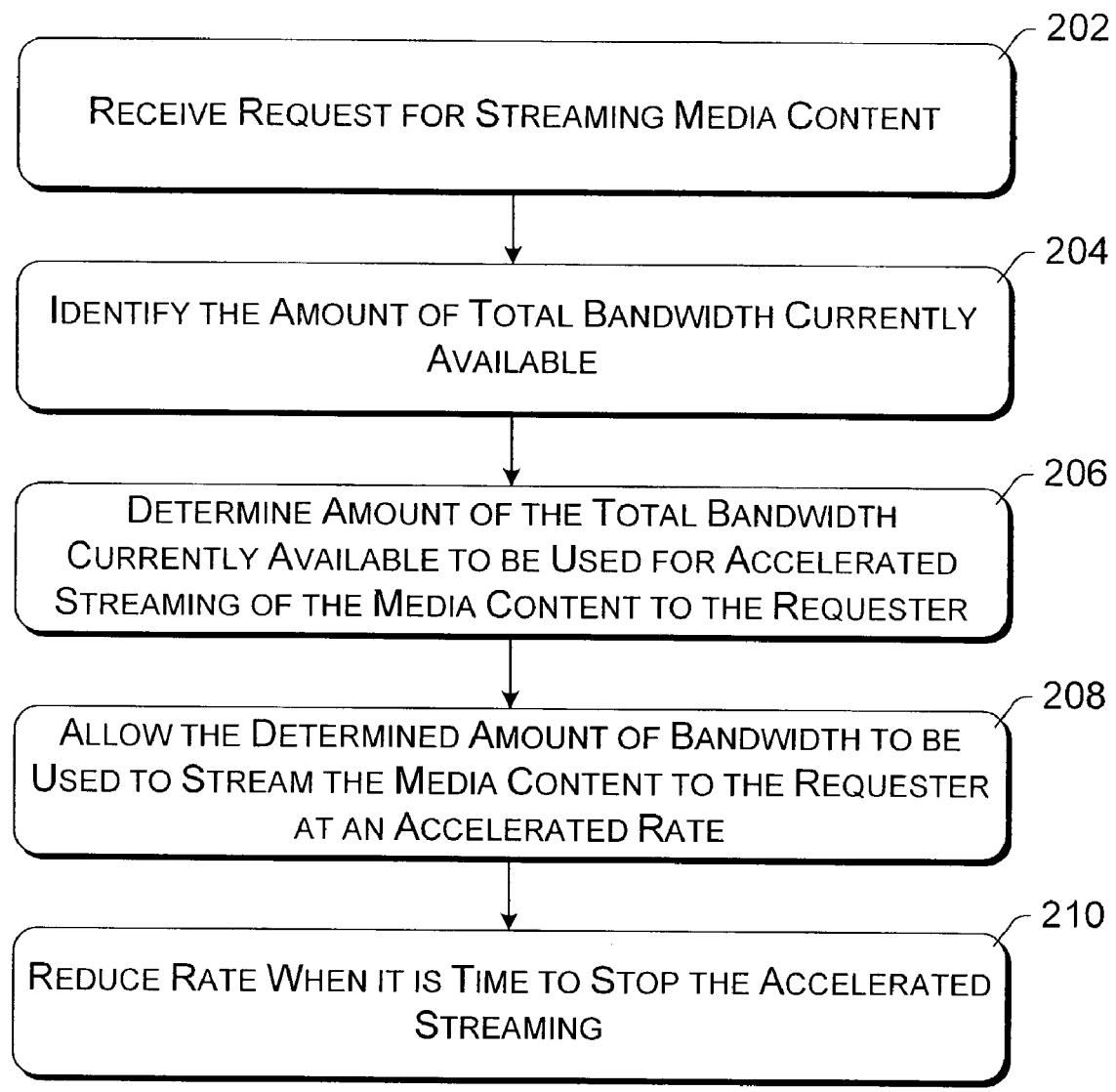
FIG. 3 is a flowchart illustrating an exemplary process for accelerated streaming of media content from a server to a client

FIG. 3 is a flowchart illustrating an exemplary process 200 for accelerated streaming of media content from a server to a client. Process 200 is implemented by a server device, such as device 146 of FIG. 2, and may be performed in software, firmware, hardware, or combinations thereof.

Initially, a request is received at the server for streaming media content to be streamed to a client device (act 202). The request may be received from the same client device as the device that the content is to be streamed to, or alternatively a different device. Oftentimes, this request is a request from a client device in response to a user selection, at the client device, of particular content that the user desires to have played back to him or her. Alternatively, the client device may be pre-programmed or otherwise configured to request particular content for streaming in the absence of any specific user request or selection. In other alternatives, the request may originate from a device other than the client device. For example, a component (not shown) of the server device may be pre-programmed or otherwise configured to request that media content be streamed to a particular client device(s). By way of another example, another device (e.g., communicating with server 146 of FIG. 2 via network 106 of FIG. 1) may send a request to the server device to stream media content to a particular client device(s).

When a request for streaming media content is received, accelerated streaming control module 150 identifies the amount of currently available bandwidth (act 204). Server device 146 can concurrently support multiple media content streams being streamed to the same or different client devices, and has a total amount of bandwidth that it can allocate to these collective streams (also referred to as the total bandwidth capacity of server device 146). This total amount may be based on hardware and/or software constraints in device 146.

The total amount of bandwidth may be a user-configurable value (e.g., set by a system administrator) or alternatively may be automatically calculated by device 146. In other alternatives, the total amount of bandwidth may be calculated by other devices, such as a router or other network device coupled to device 146, another server device coupled to device 146, and so forth. Such calculations can optionally be performed to account for the network topology and changes in both the network topology (e.g., due to malfunctioning devices) and the load on various devices in the network. For example, device 146 may be part of a complex data center that includes numerous server devices and numerous network routers. The total amount of bandwidth may thus be an ever-changing amount as different servers are accessed by different clients, different data is being requested from different servers, devices occasionally malfunction, and so forth.

Server device 146 monitors, in any of a wide variety of conventional manners, the amount of its bandwidth that is currently being used (also referred to as the bandwidth load of device 146). Thus, accelerated streaming control module 150 can readily identify an amount of currently available bandwidth (based on the total amount of bandwidth capacity for the server device and the amount of bandwidth currently being used). It should be noted that control module 150 identifies the amount of currently available bandwidth as based on the amount of bandwidth currently being used, not the amount of the total bandwidth that has been made available for accelerated streaming of media content to other client devices.

Given the amount of available bandwidth, an amount of the total bandwidth currently available to be used for accelerated streaming of the media content to the requester is determined (act 206). In one implementation, a particular percentage of the total bandwidth currently available can be used for accelerated streaming of the media content to the requester. In one implementation, this percentage is 50%. Typical values for this percentage range from 20% to 85%, although other percentages less than 20% or higher than 85% can alternatively be used. This percentage can be a fixed percentage configured in server device 146, or alternatively may be a value that can be configured (e.g., by a system administrator).

By way of example, assume that the amount of the total bandwidth currently available is 80% of the total bandwidth. Further assume that the percentage implemented in act 206 is 50%, so accelerated streaming control module 150 would determine that 50% of the currently available bandwidth is available for fast streaming the media content to the requester, which is 40% of the total bandwidth. So, assuming the total bandwidth of the server is 1000 mbps (megabits per second), then control module 150 would determine that 400 mbps is available for fast streaming the media content to the requester.

The percentage used in act 206 may be the same for all requests, or alternatively may vary based on different factors. Different percentages may be used over time, such as depending on the time of day (or week, or month, etc.) or depending on how many other media content streams are currently being streamed. Different percentages may be based on different requesters (e.g., different percentages may be used for different client devices, or the percentage used for a request received from a client device may be different than the percentage used for a request received from another device (or the server device)). Different percentages may also be used for different users of the client devices requesting the streaming media content (e.g., based on user IDs, user names, user titles or job positions, etc.). Different percentages may also be used based on an amount paid for the content (e.g., a higher percentage may be used for fee-based content than is used for free content). Different percentages may also be used for different content (e.g., the system administrator of server device 146 may determine to use a higher percentage for some content than is used for other content).

The rate determined in act 206 may also be based in part on a rate requested by the requester. If the requester requests a particular rate (e.g., along with the request submitted in act 202, by having registered with the server device and set a preference for a particular rate, or in other manners), then that rate can be used in determining the amount of bandwidth to be used for accelerated streaming of the media content to the requester. In one implementation, the determined amount of bandwidth to be used for accelerated streaming of the media content to the requester is capped by the particular rate requested by the requester. Thus, the rate requested by the requester can serve to reduce the rate determined by control module 150, but not increase the rate that would otherwise be determined by control module 150 in act 206.

The rate determined in act 206 may also be based on a maximum rate configured in the server device. The server device may be configured to fast stream media content to a requester at no more than this maximum rate. Thus, in this implementation, even if additional bandwidth is available control module will determine in act 206 that the rate is no greater than this maximum rate.

The amount of the available bandwidth available for accelerated streaming of the media content determined in act 206 is allowed to be used to stream the media content to the requester at an accelerated rate (act 208). This amount of available bandwidth operates as an upper threshold or limit, and control module 150 of FIG. 2 forwards an indication of this upper threshold amount to streaming module 144. Streaming module 144 will allow the requested content to be fast streamed to client device 102 at a rate up to this upper threshold amount, but prohibits fast streaming the content at a rate that exceeds this upper threshold amount.

Hardware limitations may also affect the rate at which accelerated streaming can be performed. For example, the network connection at client device 102 may be 256 kbps or 10 mbps, so the accelerated streaming rate would not be able to exceed 256 kbps or 10 mbps, respectively. Similarly, network congestion or other restrictions between server device 146 and client device 102 may prevent data from being streamed at greater than some rate, so the accelerated streaming rate would not be able to exceed that rate.

Thus, it can be seen that the accelerated streaming is adaptable—the rate of accelerated streaming (and the amount of bandwidth available for accelerated streaming of particular media content) is adaptable and can vary based on the current conditions of the server device streaming the data and/or the current conditions of the network coupling the server and client devices. The amount of bandwidth that is made available for accelerated streaming of particular media content to a particular client device can thus vary over time, depending on the server load and/or network load when the request for the content is made. Thus, amount of bandwidth made available for different client devices can vary, and the amount of bandwidth made available for the same content requested by the same client device at different times can also vary.

It should be noted that the actual bandwidth used during operation can be established in different manners and is dependent on the protocol employed in streaming the media content to the client device (and is also subject to the upper threshold determined by control module 150 as discussed above). For example, the client and server devices may negotiate a transfer rate that is the rate at which the server device streams the content. By way of another example, the server device may send a particular amount of data and wait for an acknowledgement from the client device that it has received that amount before sending additional data. In this example, the server device will not know exactly what the transfer rate is until it begins fast streaming the media content to the client device.

The streaming rate is then reduced when it is time to stop the accelerated streaming (act 210). Thus, an initial portion of the content is fast streamed to the client device so that the buffer at the client device can be filled to the desired level, after which the streaming rate is reduced to a steady state rate.

The determination of when to reduce the streaming rate can be made in a variety of manners. In one implementation, the client device sends an indication to the server device of how much data it wants to be fast streamed to it by the server (e.g., the amount of data it wants to fill its buffer to the desired level). This could be included as part of the request in act 202, or alternatively be sent at some other time. The indication could be a temporal duration (e.g., five seconds worth of data), or a data amount (e.g., 500 kb of data).

Alternatively, the client device may send an indication to stop fast streaming the media content when the buffer of the client device is filled to the desired level. Thus, in this implementation, the server device continues to fast stream the media content to the client device until the client device requests that it stop. In another alternative, the server may be pre-configured (e.g., by a system administrator) with an indication of how long to fast stream the media content. In yet another alternative, the duration of the fast streaming may be defined as part of the streaming protocol followed by the client and server devices. Thus, in this alternative implementation, the amount of media content to fast stream (whether it be defined in terms of a temporal duration (e.g., five seconds) or an amount of data (e.g., 500 kb)) is known to both client and server devices without using any additional communication of when to stop the fast streaming.

Process 200 is performed when the requester first requests content to be streamed to the client device. Process 200 may also be performed at other times. For example, a break in the connection between the client and server devices, or other network problems between the client and server devices, may cause client device to play back all of the data in buffer 152. In response to this situation, the client device will again re-fill buffer 152 to the desired level using the adaptable accelerated streaming.

In one implementation, the amount of bandwidth available to be used for accelerated streaming of the media content to the client device is determined at the time that the request for the streaming media content is received. It should be noted that there may be some delays involved in making the determination (e.g., the determination may be made a few or several seconds after the request is received at the server device). This amount is then used as a basis for accelerated streaming until it is time to stop the accelerated streaming in act 210.

Alternatively, the server device may re-evaluate, at regular or irregular intervals (e.g., every second or every 100 ms, or whenever fast streaming of another stream stops) what the amount of bandwidth available to be used for accelerated streaming of the media content to the client device is. Thus, steps 204-208 could be repeated multiple times while fast streaming a media content stream to the client device. Server device could perform this re-evaluation for all media streams being fast streamed, or alternatively only selected media streams (e.g., only those streams that are being fast streamed at a rate this is equal to or within a threshold amount of the amount of bandwidth previously determined as being available for accelerated streaming of those streams).

In some embodiments, the adaptable accelerated streaming may be used only at certain times, depending on the load of the server device. In one implementation, the adaptable accelerated streaming is used only after the amount of server bandwidth currently being used exceeds a threshold amount. If the amount of server bandwidth currently being used does not exceed the threshold amount, then the rate of fast streaming can be determined in different manners (e.g., up to some pre-configured amount established in the server device). The value of this threshold amount can vary, and in one exemplary implementation is between 20% and 40% although other values may be used.

In another implementation, the adaptable accelerated streaming is used only when the amount of server bandwidth currently being used does not exceed a threshold amount. If the amount of server bandwidth currently being used exceeds the threshold amount, then another mechanism is used to determine the rate of fast streaming, or alternatively no fast streaming may be used. The value of this threshold amount can vary, and in one exemplary implementation is between 80% and 95% although other values may be used.

In yet another implementation, content is streamed to a client device at at least a minimum accelerated rate (e.g., 50% or 100% faster than the steady state rate) until a problem with the streaming is detected (e.g., until more than a threshold number of data packets streamed to the client device are lost, or data packets are being lost at greater than a threshold rate). Once a problem with the streaming is detected, the accelerated streaming may be stopped (e.g., and streaming reduced to the steady state rate) or the accelerated rate may be reduced. In this implementation, this streaming at the minimum accelerated rate is performed (until a problem with the streaming is detected) even though it may violate certain thresholds or maximums discussed above.

Figure 4:
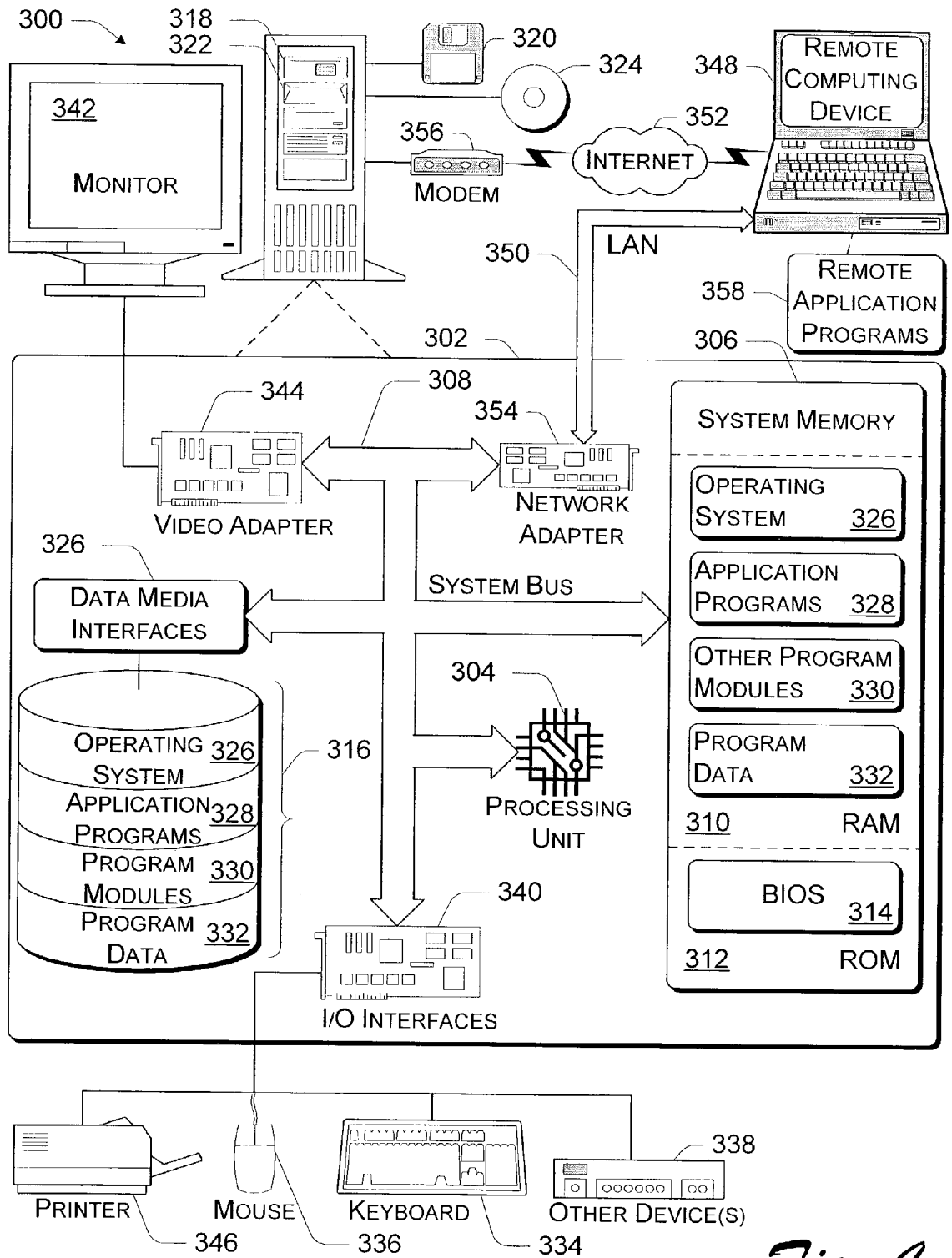
FIG. 4 illustrates an exemplary general computer environment which can be used to implement the techniques described herein.

FIG. 4 illustrates an exemplary general computer environment 300, which can be used to implement the techniques described herein. The computer environment 300 is only one example of a computing environment in which the adaptable accelerated content streaming can be used and is not intended to suggest any limitation as to the scope of use or functionality of the computer and network architectures. Neither should the computer environment 300 be interpreted as having any dependency or requirement relating to any one or combination of components illustrated in the exemplary computer environment 300.

Computer environment 300 includes a general-purpose computing device in the form of a computer 302. Computer 302 can be, for example, a client 102 or server 104 of FIG. 1, or a client 102 or server 146 of FIG. 2. The components of computer 302 can include, but are not limited to, one or more processors or processing units 304 (which may include a security processor or security co-processor), a system memory 306, and a system bus 308 that couples various system components including the processor 304 to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 302 typically includes a variety of computer readable media. Such media can be any available media that is accessible by computer 302 and includes both volatile and non-volatile media, removable and non-removable media.

The system memory 306 includes computer readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/non-volatile computer storage media. By way of example, FIG. 4 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 318, and optical disk drive 322 are each connected to the system bus 308 by one or more data media interfaces 326. Alternatively, the hard disk drive 316, magnetic disk drive 318, and optical disk drive 322 can be connected to the system bus 308 by one or more interfaces (not shown).

The disk drives and their associated computer-readable media provide non-volatile storage of computer readable instructions, data structures, program modules, and other data for computer 302. Although the example illustrates a hard disk 316, a removable magnetic disk 320, and a removable optical disk 324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 316, magnetic disk 320, optical disk 324, ROM 312, and/or RAM 310, including by way of example, an operating system 326, one or more application programs 328, other program modules 330, and program data 332. Each of such operating system 326, one or more application programs 328, other program modules 330, and program data 332 (or some combination thereof) may implement all or part of the resident components that support the distributed file system.

A user can enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, or a universal serial bus (USB).

A monitor 342 or other type of display device can also be connected to the system bus 308 via an interface, such as a video adapter 344. In addition to the monitor 342, other output peripheral devices can include components such as speakers (not shown) and a printer 346 which can be connected to computer 302 via the input/output interfaces 340.

Computer 302 can operate in a networked environment using logical connections to one or more remote computers, such as a remote computing device 348. By way of example, the remote computing device 348 can be a personal computer, portable computer, a server, a router, a network computer, a peer device or other common network node, and the like. The remote computing device 348 is illustrated as a portable computer that can include many or all of the elements and features described herein relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which can be internal or external to computer 302, can be connected to the system bus 308 via the input/output interfaces 340 or other appropriate mechanisms. It is to be appreciated that the illustrated network connections are exemplary and that other means of establishing communication link(s) between the computers 302 and 348 can be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components such as the operating system are illustrated herein as discrete blocks, although it is recognized that such programs and components reside at various times in different storage components of the computing device 302, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Adaptable accelerated content streaming has thus been described. Whether to accelerate content streaming and/or how much content streaming can be accelerated is adaptable as discussed above.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method, implemented in a server computing device, the method comprising:
   receiving a request for media content to be streamed to a client device;
   identifying an available bandwidth of the server computing device;
   determining, as a percentage of the available bandwidth of the server computing device, an amount of bandwidth available for accelerated streaming of the media content to the client device; accelerating, up to a particular rate that is greater than a steady state rate, streaming of the media content to the client device until a data buffer at the client device is filled to a desired level with a portion of the media content, and then reducing streaming of the media content to the client device from the particular rate to the steady state rate, wherein the particular rate is based at least in part on the amount of bandwidth available for accelerated streaming, wherein said accelerating is performed only if the amount of bandwidth available for accelerated streaming exceeds a threshold amount;
   re-determining, while accelerating streaming of the media content to the client device, the amount of bandwidth available for accelerated streaming of the media content to the client device; and
   wherein the particular rate is based at least in part on the re-determined amount of bandwidth available for accelerated streaming of the media content to the client device.

2. A method as recited in claim 1, wherein the particular rate is further based at least in part on a rate at which the client device can receive the media content.

3. A method as recited in claim 1, wherein the particular rate comprises a percentage of the amount of bandwidth available for accelerated streaming.

4. A method as recited in claim 1, wherein receiving the request comprises receiving the request from the client device.

5. One or more computer storage media having stored thereon a plurality of instructions that, when executed by one or more processors of a server computing device, causes the one or more processors to: determine, in response to a request received from a client computing device for the media content to be streamed to the client computing device, an amount of bandwidth available for accelerated streaming of media content from the server computing device to a client computing device, wherein the amount of bandwidth is a portion of an amount of bandwidth currently available on the server computing device; stream, at an accelerated rate that is greater than a steady state rate, an initial portion of the media content to the client computing device until a buffer at the client computing device is filled to a desired level, and then stream a remaining portion of the media content to the client computing device at the steady state rate: re-determine, while accelerating streaming of the media content to the client computing device, the amount of bandwidth available for accelerated streaming of the media content to the client computing device; and wherein the accelerated rate is based at least in part on the re-determined amount of bandwidth available for accelerated streaming of the media content to the client device.

6. One or more computer storage media as recited in claim 5, wherein the server computing device comprises an origin server.

7. One or more computer storage media as recited in claim 5, wherein the server computing device comprises a proxy server.

8. One or more computer storage media as recited in claim 5, wherein the amount of the bandwidth is in a range of 20% to 85% of the amount of bandwidth currently available on the server computing device.

9. A computing device comprising:
   a streaming module configured to manage streaming of media content from the computing device over a network to a remote client device; an accelerated streaming control module configured to determine an amount of bandwidth available for streaming the media content to the remote client device at an accelerated rate based at least in part on a current bandwidth load of the computing device, wherein the accelerated rate is greater than a steady state rate; and wherein the streaming module is further configured to allow an initial portion of the media content to be streamed over the network at the accelerated rate until a data buffer at the remote client device is filled to a desired level, and further configured to allow a remaining portion of the media content to be streamed over the network at the steady state rate, the streaming module further being configured to re-determine, while accelerating streaming of the media content to the client device, the amount of bandwidth available for accelerated streaming of the media content to the client device; and wherein the particular rate is based at least in part on the re-determined amount of bandwidth available for accelerated streaming of the media content to the client device.

10. A system as recited in claim 9, wherein the computing device comprises an origin server.

11. A system as recited in claim 9, wherein the computing device comprises a proxy server.

12. A system as recited in claim 9, wherein the amount of bandwidth available for streaming the media content to the remote client device at the accelerated rate comprises a percentage of the difference between a total bandwidth of the computing device and the current bandwidth load of the computing device.

* * * * *